United States Patent [19]
Roitz et al.

[11] 3,953,104
[45] Apr. 27, 1976

[54] CAMERA VIEWER TOY

[75] Inventors: Nicholas Joseph Roitz, Torrance; Harold Eugene Steinberg, Culver City, both of Calif.

[73] Assignee: Mattel, Inc., Hawthorne, Calif.

[22] Filed: Nov. 25, 1974

[21] Appl. No.: 526,993

[52] U.S. Cl. .................................. 350/4; 352/129
[51] Int. Cl.² ......................................... G02B 27/08
[58] Field of Search .................... 350/4, 5; 352/129

[56] References Cited
UNITED STATES PATENTS
1,990,867  2/1935  Harvey .................................. 350/4

FOREIGN PATENTS OR APPLICATIONS
11,642  3/1934  Australia ............................... 350/4

Primary Examiner—Monroe H. Hayes
Attorney, Agent, or Firm—Max E. Shirk; Stephen L. King

[57] ABSTRACT

Color wheel, having an opening provided therein, may be rotated in a first direction to generate a colorful display through a kaleidoscope-type observation tube and in a second, reversed direction to fix the color-wheel opening in alignment with an external opening and the observation tube to bring real-life objects into view. A shutter rotates regardless of direction of movement of the color wheel to simulate the shutter in a movie camera.

8 Claims, 5 Drawing Figures

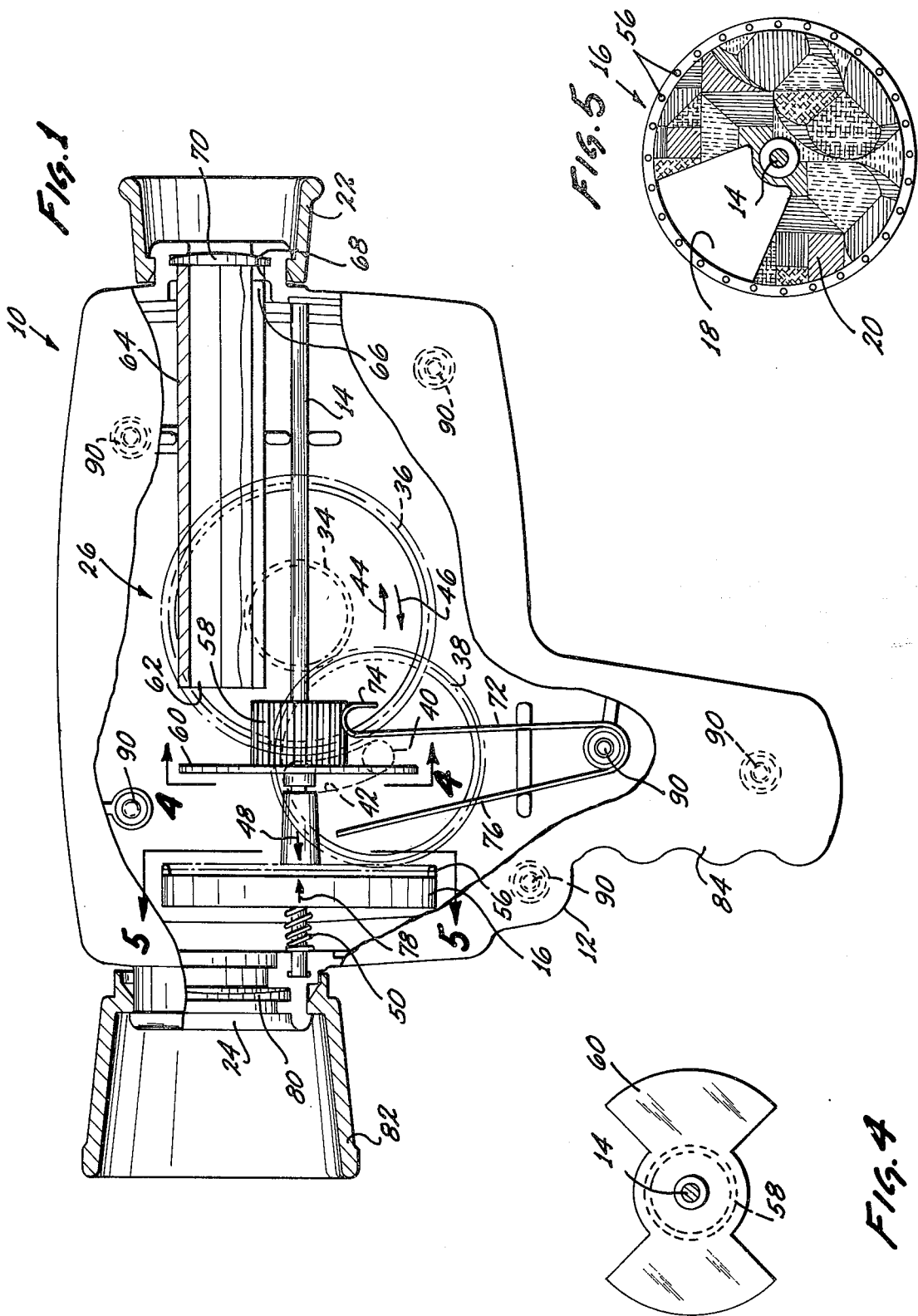

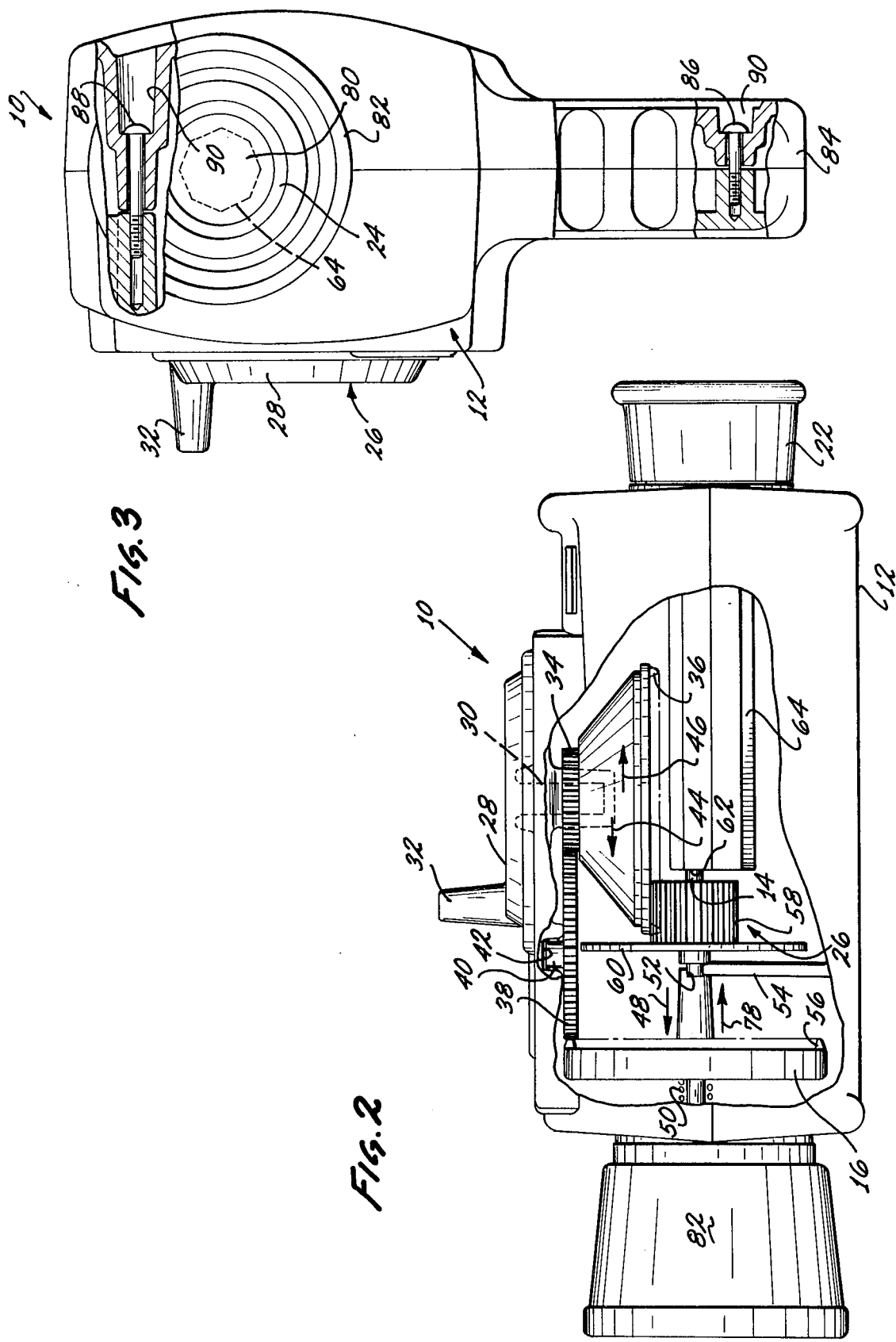

CAMERA VIEWER TOY

BACKGROUND OF THE INVENTION

The background of the invention will be set forth in two parts.

FIELD OF THE INVENTION

The present invention relates generally to the field of camera viewer toys and more particularly to such a toy which includes a color wheel and kaleidoscope-type observation tube.

DESCRIPTION OF THE PRIOR ART

Copending application No. 526,879, which is owned by the assignee of the instant application and which is being filed concurrently herewith, discloses a simulated movie camera toy wherein a simulated view finder is provided with an aperture in alignment with an opening in a simulated camera lens so that a real image may be viewed through the simulated view finder. A shutter may then be rotated between the aperture and the opening so that the real image appears to flicker.

The present invention exemplifies improvements over simulated movie camera toys of this type.

SUMMARY OF THE INVENTION

A primary object of the present invention is to provide a new and useful camera viewer toy.

Another object to the invention is to provide a toy of the type described which includes a color wheel and a kaleidoscope-type observation tube for generating colorful displays.

According to the present invention, a camera viewer toy comprises a housing having the general size and shape of a camera.

A color wheel is rotatably mounted in the housing and is provided with an opening and a plurality of colorful designs surrounding the opening. An eye piece is mounted in the housing upstream of the color wheel and in alignment therewith.

The housing is provided with an opening downstream of the color wheel and in alignment with the opening in the color wheel when the color wheel is held in a predetermined rotated position so that a viewer using the eye piece may view objects outside of the housing.

Wheel-moving means are connected to the color wheel for selectively rotating the wheel to present a colorful display to the viewer and for positioning the color-wheel opening in alignment with the housing opening.

The colorful display may be enhanced by a kaleidoscope-type observation tube which is mounted inside the housing upstream of the color wheel in communication with the eye piece. Additionally, a shutter may be connected to the wheel-moving means for continuous rotation to simulate the shutter used in movie cameras. A positive lens may be used in the eye piece to bring the color wheel into proper focus and a negative lens may be provided in the housing opening to bring the outside objects into focus.

The wheel-moving means includes a crank gear having a large-diameter gear portion in driving engagement with a gear on the shutter and a small-diameter portion in driving engagement with an idler gear having a short stub shaft mounted in an arcuate channel. The wheel-moving means also includes a color-wheel gear rotatably mounted on the same axle as the shutter gear. Additionally, the wheel-moving means includes a stop on the color wheel which is biased into engagement with a fixed stop on the housing when the axle rotates the color wheel in a first direction to bring the color-wheel opening into alignment with the housing opening. The axle is rotated in this first direction by a crank pin on the crank gear. When the crank gear is rotated in a reverse direction, the idler gear moves upwardly in the arcuate channel and into driving engagement with the color-wheel gear causing it to move away from the stop and rotate the colors displayed thereon past an objective opening in the observation tube.

A suitable spring means biases the idler gear in a direction to maintain the stop shaft in the arcuate channel. The spring means may include a portion which engages the shutter gear to produce a clicking sound enhancing the simulation of a movie camera.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

BRIEF DESCRIPTION OF THE DRAWINGS

FIG. 1 is a front elevational view, with parts broken away to show internal construction, of a camera viewer toy constituting a presently preferred embodiment of the invention;

FIG. 2 is a top plan view, with parts broken away to show internal construction, of the toy FIG. 1;

FIG. 3 is a front elevational view of the toy;

FIG. 4 is a cross-sectional view taken along line 4—4 of FIG. 1; and

FIG. 5 is a cross-sectional view taken along line 5—5 of FIG. 1.

DESCRIPTION OF THE PREFERRED EMBODIMENT

A camera viewer toy constituting a presently preferred embodiment of the invention, generally designated 10, includes a housing 12 having the general size and shape of a camera and having an axle 14 rotatably mounted therein. A color wheel 16 is rotatably mounted in housing 12 on axle 14 and is provided with an opening 18 around which a plurality of colorful designs 20 are provided (FIG. 5). An eye piece or viewfinder 22 is mounted in housing 12 upstream of color wheel 16 and in alignment therewith. An opening 24 is provided in housing 12 downstream of color wheel 16 in alignment with opening 18 in color wheel 16 when it is held in a predetermined rotated position so that a viewer using eye piece 22 may view objects outside of housing 12.

Toy 10 also includes a wheel-moving means 26 which may selectively engage color wheel 16 for rotating color wheel 16 to present a colorful display to the viewer and for positioning color-wheel opening 18 in alignment with housing opening 24.

Wheel-moving means 26 includes a crank 28 rotatably mounted in housing 12 by a journal 30. Crank 28 includes a crank pin 32, a small-diameter crank gear 34 and a large-diameter crank gear 36. Wheel-moving means 26 also includes an idler gear 38 rotatably and swingably mounted in housing 12 by a stop shaft 40 disposed in an arcuate channel 42 provided in housing 12. Idler gear 38 is driven by small-diameter gear 34. When crank 28 is rotated in a direction which moves the top of small-diameter gear 34 in the direction of arrow 44, idler gear 38 is driven downwardly in arcuate channel 42 to the position shown in FIG. 1 where idler gear 38 becomes redundant. When crank 28 is rotated in the opposite, reverse direction, the top of small-diameter gear 34 will move in the direction of arrow 46 and will move idler gear 38 upwardly in channel 42 so that idler gear 38 will drivingly engage color wheel 16 pushing it along axle 14 in the direction of arrow 48 against the bias of a compression spring 50 releasing a color-wheel stop 52 from engagement with a fixed stop 54 (FIG. 2) so that color wheel 16 is free to be rotated by small-diameter gear 34 and idler gear 38 through gear teeth 56 provided on color wheel 16.

Wheel-moving means 26 also includes a shutter gear 58 drivingly engaged by large-diameter gear 36 for rotating a shutter 60 rotatably mounted on axle 14 and having the configuration shown in FIG. 4. Shutter 60 simulates the shutter in a real-life movie camera and is mounted upstream of color wheel 16 adjacent the objective opening 62 provided on an observation tube 64 having an upstream end 66 mounted in an opening 68 (FIG. 1) which is provided in housing 12 and which is encompassed by eye piece 22. A positive lens 70 is mounted in end 66 of observation tube 64 for bringing color wheel 16 into focus. Observation tube 64 may have a reflective coating on its inner surface and is a multi-sided tube adapted to enhance the image from color wheel 16 through a kaleidoscope effect. Shutter 60 may be made more realistic by providing a spring finger 72 having a free end 74 engaging the teeth on shutter gear 58. Spring finger 72 is formed integrally with a second finger 76 which presses against idler gear 38 for fulcruming idler gear 38 o that it may move upwardly and for maintaining stop shaft 40 in channel 42. It is to be noted that shutter 60 is continuously rotated by crank 28 regardless of its direction of rotation. Color wheel 16, on the other hand, ceases to be rotated by idler gear 38 when it moves downwardly in housing 12 to the position shown in FIG. 1. Spring 50 then moves color wheel 16 along axle 14 in the direction of arrow 78 so that color-wheel stop 52 will again engage fixed stop 54 when the friction between color wheel 16 and axle 14 rotates color wheel 16 sufficiently to bring stop 52 to the position shown in FIG. 2. In this position, opening 18 in color wheel 16 is aligned with opening 24 and eye piece 22 so that objects outside of housing 12 may be viewed through lens 70, tube 64, opening 18 and opening 24. These objects may be brought into focus with a negative lens 80 mounted in opening 24. A lens cap 82 may be provided at opening 24 in keeping with the camera configuration of housing 12. This configuration may be completed by providing a pistol-type grip 84 which depends from housing 12. Housing 12 may be molded from suitable polymeric materials and two halves which are joined together by suitable fastening means, like the screws shown at 86, 88 in FIG. 3. These screws may pass through several hollow bosses 90 provided in housing 12.

A user of camera viewer toy 10 may take hand grip 84 in his left hand and crank pin 32 in his right hand. Eye piece 22 may be positioned at one eye of the user and he may then turn crank 28 clockwise (looking in from the right in FIG. 2). Small-diameter gear 34 will drive idler gear 38 to the bottom of arcuate channel 42 permitting spring 50 to move color wheel 16 along axle 14 so that stop 52 will engage stop 54 and maintain opening 18 in alignment with negative lens 80, objective opening 62 and positive lens 70. This will permit external objects to be viewed.

Simultaneously, large-diameter gear 36 will rotate shutter gear 58 and shutter 60. As shutter 60 rapidly rotates past objective opening 62, the view of the external object will be made to look like a still picture on a movie camera. The clicking sound produced by finger 72 on gear 58 will add to the entertainment value of the toy.

The user may then rotate crank 28 in a counterclockwise direction causing small-diameter gear 34 to move idler gear 38 upwardly in arcuate channel 42 and engage color wheel 16 moving it in the direction of arrow 48 to release stop 52. Gear 38 will then rotate color wheel 16 while large-diameter gear 36 simultaneously rotates shutter 60. Color display 20 will then be seen through positive lens 70 and will be given a variegated changing pattern by observation tube 64.

While the particular camera viewer toy herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims which form a part of this disclosure.

Whenever the term "means" is employed in these claims, this term is to be interpreted as defining the corresponding structure illustrated and described in this specification or the equivalent of the same.

What is claimed is:

1. A camera viewer toy, comprising:
   a housing having the general size and shape of a camera;
   a color wheel rotatably mounted in said housing, said color wheel having an opening provided therein and a plurality of colorful designs surrounding said opening;
   an eye piece mounted in said housing upstream of said color wheel and in alignment therewith;
   An opening in said housing downstream of said color wheel, said housing opening being in alignment with the opening in said color wheel when said color wheel is held in a predetermined, rotated position, whereby a viewer using said eye piece may view objects outside of said housing; and
   wheel-moving means connected to said color wheel for selectively rotating said color wheel to present a colorful display to said viewer and for fixing said color-wheel opening in alignment with said housing opening.

2. A camera viewer toy as stated in claim 1 including a multi-sided observation tube mounted in said housing between said color wheel and said eye piece for creating a variegated changing pattern.

3. A camera viewer toy as stated in claim 1 including a positive lens in said eye piece and a negative lens in said opening for bringing said color wheel and said outside object, respectively, into focus.

4. A camera viewer toy as stated in claim 1 wherein said wheel-moving means comprises:
   a crank having a crank pin and a journal rotatably mounting said crank in said housing;
   a crank gear connected to said crank;

an idler gear engaged by said crank gear, said idler gear being rotatably and swingably mounted in an arcuate channel provided in said housing;

a color-wheel gear on said color wheel, said color-wheel gear being engaged by said idler gear when it is swung to a first position in said arcuate channel and being disengaged therefrom when it is swung to a second position within said arcuate channel;

an axle rotatably mounting said color wheel in said housing;

a stop on said color wheel;

a fixed stop in said housing in the path-of-travel of said color-wheel stop; and spring means on said axle in engagement with said color wheel for biasing said color-wheel stop into the path-of-travel of said fixed stop when said idler gear is disengaged from said color-wheel gear, said color-wheel stop being located with respect to said color-wheel opening so that said stops will hold said color-wheel opening in alignment with said housing opening.

5. A camera viewer toy as stated in claim 1 including a shutter rotatably mounted in said housing between said color wheel and said eye piece.

6. A camera viewer toy comprising:

a housing having a positive-lens opening at one end and a negative-lens opening at the other end, said openings being in alignment with each other;

an axle mounted in said housing below said openings, the major axis of said axle being approximately parallel to the optical axis of said lenses;

a color wheel rotatably mounted on said axle adjacent said negative-lens opening, said color wheel having an opening provided therein, and a colorful display surrounding said opening, said color wheel also having gear teeth and a color-wheel stop provided thereon;

a multi-sided observation tube mounted in said housing, said observation tube having an objective opening at one end and a positive lens at its other end, said positive lens being mounted in said positive-lens opening and said objective opening being positioned adjacent said color wheel;

a shutter rotatably mounted on said axle between said color wheel and said objective opening;

a shutter gear affixed to said shutter for imparting rotation thereto;

a crank rotatably mounted in said housing, said crank including a large-diameter gear drivingly engaging said shutter gear and a small-diameter gear;

an idler gear rotatably and slidably mounted in said housing in an arcuate channel, said idler gear being in driving engagement with said small-diameter gear, said idler gear being adapted to drivingly engage said color-wheel gear when said crank is rotated in one direction and being adapted to become disengaged from said color-wheel gear when said crank is rotated in the opposite, reverse direction;

a compression spring encompassing said axle between said negative-lens opening and said color wheel for biasing said color-wheel stop to a position in said housing where said color-wheel stop will engage a fixed stop provided in said housing when said idler gear is disengaged from said color-wheel gear, whereby friction between said color wheel and said axle will carry said color-wheel stop into engagement with said fixed stop, said color-wheel stop being located on said color wheel in such a position that said color-wheel opening will become aligned with said negative-lens opening when said color-wheel stop engages said fixed stop;

a negative lens mounted in said negative-lens opening; and a bifurcated spring mounted in said housing, said bifurcated spring having one leg engaging said shutter gear for creating a clicking sound when said shutter gear is rotated and a second leg biasing said idler gear into said arcuate channel.

7. In a simulated movie camera toy of the type which includes a simulated view finder having an aperture provided therein, a simulated camera lens having an opening provided therein and a shutter rotatably mounted between said aperture and said opening, an improvement which comprises:

a color wheel rotatably mounted in said camera toy between said shutter and said lens opening, said color wheel having an opening provided therein and a plurality of colorful designs surrounding said color-wheel opening; and means for selectively rotating said color wheel in a first direction and for holding said color wheel against rotating in a second opposite direction while continuously rotating said shutter in either direction, said selective-rotating means including means for fixing said color-wheel opening in alignment with said aperture and said lens opening when said color wheel is held against rotating in said second opposite direction, whereby a vewer may look through said aperture, said color-wheel opening and said lens opening at objects outside said simulated movie camera toy.

8. An improvement as stated in claim 7 including a multi-sided observation tube mounted in said camera toy between said color wheel and said lens aperture for creating a variegated changing pattern.

* * * * *